United States Patent
Xie et al.

(10) Patent No.: US 11,317,333 B2
(45) Date of Patent: Apr. 26, 2022

(54) PREEMPT SINGLE RADIO VOICE CALL CONTINUITY BY MOVING TO VOICE OVER WIFI TO IMPROVE VOICE/VIDEO CALL QUALITY

(71) Applicant: QUALCOMM Incorporated, San Diego, CA (US)

(72) Inventors: Yong Xie, San Diego, CA (US); Arvind Vardarajan Santhanam, San Diego, CA (US); Carlos Marcelo Dias Pazos, Carlsbad, CA (US); Vikram Singh, San Diego, CA (US); Mouaffac Ambriss, San Diego, CA (US); Sumit Kumar Singh, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/870,686

(22) Filed: May 8, 2020

(65) Prior Publication Data
US 2021/0352551 A1   Nov. 11, 2021

(51) Int. Cl.
| | | |
|---|---|---|
| *H04W 4/00* | (2018.01) | |
| *H04W 36/18* | (2009.01) | |
| *H04B 17/318* | (2015.01) | |
| *H04W 36/00* | (2009.01) | |
| *H04W 36/08* | (2009.01) | |
| *H04W 36/30* | (2009.01) | |

(52) U.S. Cl.
CPC .......... *H04W 36/18* (2013.01); *H04B 17/318* (2015.01); *H04W 36/0058* (2018.08); *H04W 36/08* (2013.01); *H04W 36/30* (2013.01)

(58) Field of Classification Search
CPC . H04W 36/18; H04W 36/0058; H04W 36/30; H04W 36/08; H04B 17/318
USPC .................................. 455/436–437; 370/331
See application file for complete search history.

(56) References Cited

U.S. PATENT DOCUMENTS

| | | | |
|---|---|---|---|
| 2010/0115124 A1 | 5/2010 | Cai et al. | |
| 2014/0079022 A1 | 3/2014 | Wang et al. | |
| 2015/0281989 A1 | 10/2015 | Yang et al. | |
| 2016/0219474 A1 | 7/2016 | Singh et al. | |
| 2016/0337928 A1 | 11/2016 | Yang et al. | |
| 2016/0353340 A1 | 12/2016 | Yang et al. | |
| 2018/0213463 A1* | 7/2018 | Cheng | H04W 40/14 |

OTHER PUBLICATIONS

International Search Report and Written Opinion—PCT/US2021/026645—ISA/EPO—dated Jul. 21, 2021.

* cited by examiner

*Primary Examiner* — Marcos Batista
(74) *Attorney, Agent, or Firm* — Dalei Dong; Procopio, Cory, Hargreaves & Savitch LLP

(57) ABSTRACT

A configuration is disclosed to enable a UE to preempt SRVCC by triggering a handover to a Wi-Fi network. The apparatus determines whether a Wi-Fi cell is viable as a first target cell, from a plurality of target cells, serving the UE to continue the active transmission on the Wi-Fi cell. The apparatus extends a TTT timer length based at least in part on the determination that the Wi-Fi cell is viable as the target cell serving the UE to continue the active transmission on the Wi-Fi cell. The apparatus initiates a handover to the Wi-Fi cell from the first network prior to the expiration of a TTT timer and prior to the first network initiating a handover to a second target cell, from the plurality of target cells, on a second network.

28 Claims, 12 Drawing Sheets

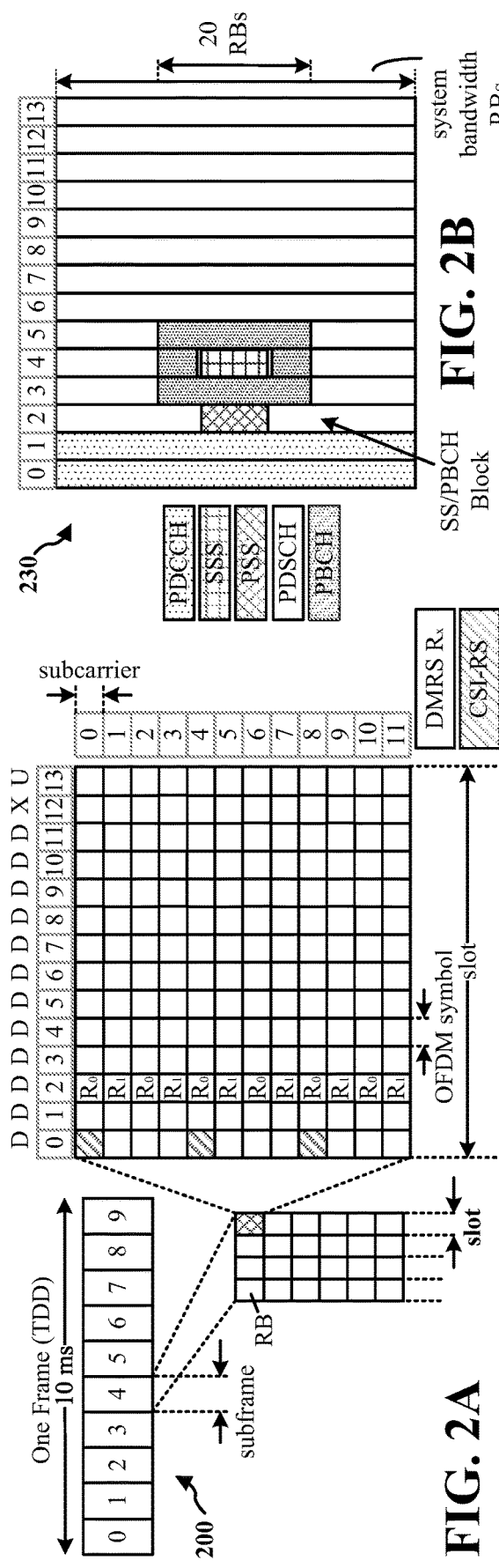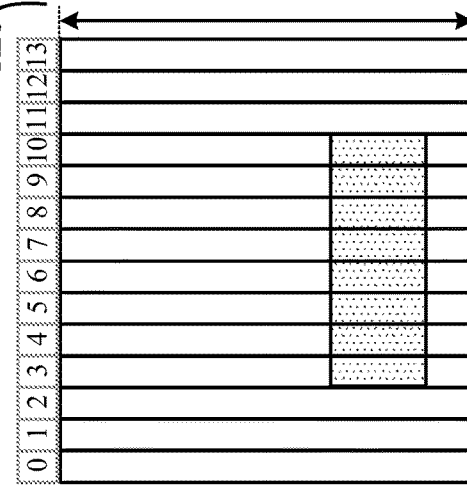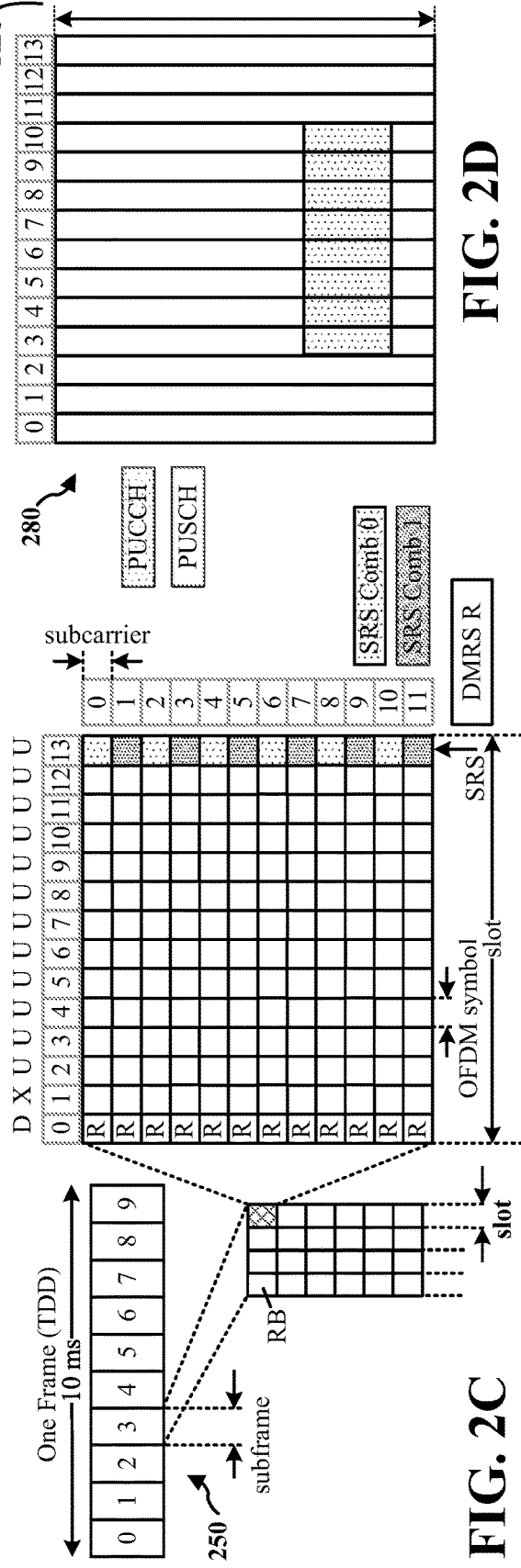
FIG. 2A
FIG. 2B
FIG. 2C
FIG. 2D

:PREEMPT SINGLE RADIO VOICE CALL CONTINUITY BY MOVING TO VOICE OVER WIFI TO IMPROVE VOICE/VIDEO CALL QUALITY

FIELD OF THE DISCLOSURE

The present disclosure relates generally to communication systems, and more particularly, to a configuration to preempt single radio voice call continuity (SRVCC) by moving to voice over Wi-Fi.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus determines whether a Wi-Fi cell is viable as a first target cell, from a plurality of target cells, serving the UE to continue an active transmission on the Wi-Fi cell. The apparatus extends a time-to-trigger (TTT) timer length based at least in part on the determination that the Wi-Fi cell is viable as the target cell to receive the active transmission from the first network. The apparatus initiates a handover to the Wi-Fi cell from the first network prior to the expiration of a TTT timer and prior to the first network initiating a handover to a second target cell, from the plurality of target cells, on a second network.

In some aspects, the apparatus may receive, from a base station of the first network, handover thresholds for the handover between the first network and the second network.

In some aspects, the Wi-Fi cell is viable as the target cell serving the UE to continue the active transmission on the Wi-Fi cell based on at least a signal strength of the Wi-Fi cell.

In some aspects, the apparatus may determine whether the Wi-Fi cell is viable as the target cell prior to the second target cell on the second network meeting handover thresholds.

In some aspects, the apparatus may initiate the handover to the Wi-Fi cell from the first network if a signal strength of the Wi-Fi cell is greater than a signal strength of the first network.

In some aspects, the apparatus extending the TTT timer length delays the transmission of a measurement report from the UE to a base station, wherein the measurement report comprises signal strengths of the first network and the second network in preparation of the handover from the first network to the second network.

In some aspects, the delay in the transmission of the measurement report allows for the initiation of the handover to the Wi-Fi cell from the first network.

In some aspects, the measurement report is not transmitted at the expiration of the TTT timer if the handover to the Wi-Fi cell is completed.

In some aspects, the measurement report is not transmitted at the expiration of the TTT timer if the first network does not have the active transmission.

In some aspects, the apparatus may determine whether a signal strength of the second target cell is greater than a signal strength of the active transmission on the first network, such that the first network is preparing to initiate the handover to the second target cell.

In another aspect of the disclosure, a method, a computer-readable medium, and an apparatus are provided. The apparatus may be a device at a base station. The device may be a processor and/or a modem at a base station or the base station itself. The apparatus communicates, with a user equipment (UE), on a first network, wherein an active transmission occurs between the base station and the UE. The apparatus receives, from the UE, an indication to perform a handover of the active transmission to a Wi-Fi cell, wherein the Wi-Fi cell is a first target cell from a plurality of target cells. The apparatus performs the handover of the active transmission to the Wi-Fi cell in response to the indication received from the UE.

In some aspects, the apparatus transmits, to the UE, handover thresholds for a handover between the first network and a second network.

In some aspects, the Wi-Fi cell is viable as the target cell serving the UE to continue the active transmission on the Wi-Fi cell based on at least a signal strength of the Wi-Fi cell.

In some aspects, the apparatus receives the indication to perform the handover of the active transmission to the Wi-Fi cell prior to an expiration of a time-to-trigger (TTT) timer and prior to the first network initiating a handover to a second target cell, from the plurality of target cells, on a second network.

In some aspects, the apparatus receives the indication to perform the handover of the active transmission to the Wi-Fi cell if a signal strength of the Wi-Fi cell is greater than a signal strength of the first network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
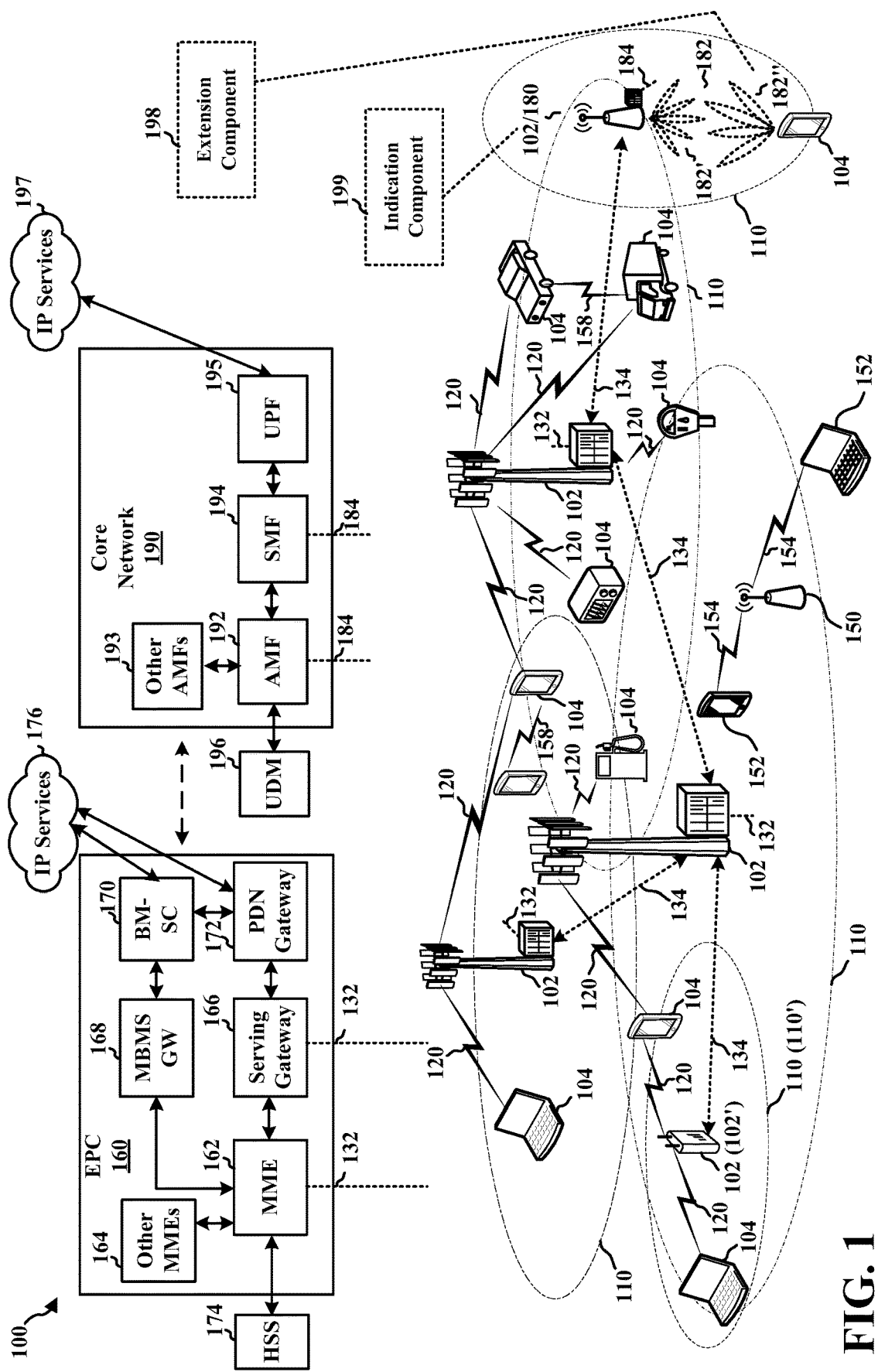
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to extend a TTT timer to preempt an SRVCC handover and trigger a handover to a Wi-Fi network. For example, the UE 104 of FIG. 1 may include an extension component 198 configured to extend a TTT timer length based on a determination that a handover to a Wi-Fi cell from a first network is acceptable. The UE 104 determines whether a handover to a Wi-Fi cell is viable as a first target cell, from a plurality of target cells, serving the UE to continue an active transmission on the Wi-Fi cell. The UE 104 extends a TTT time length based at least in part on the determination that the Wi-Fi cell is viable as the target cell serving the UE to continue the active transmission on the Wi-Fi cell. The UE 104 initiates the handover to the Wi-Fi cell from the first network prior to the expiration of a TTT timer and prior to the first network initiating a handover to a second target cell, from the plurality of target cells, on a second network.

Referring again to FIG. 1, in certain aspects, the base station 180 may be configured to handover an active transmission to a Wi-Fi network in response to a UE 104 triggering the handover. For example, the base station 180 may include an indication component 199 that may receive, from the UE, an indication to perform a handover of an active transmission to a Wi-Fi cell. The base station 180 may communicate, with the UE 104, on a first network, wherein an active transmission occurs between the base station 180 and the UE 104. The base station 180 may receive, from the UE, an indication to perform a handover of the active transmission to a Wi-Fi cell, wherein the Wi-Fi cell is a first target cell from a plurality of target cells. The base station 180 may perform the handover of the active transmission to the Wi-Fi cell in response to the indication received from the UE.

The concepts described herein may be applicable to other similar areas, such as LTE, LTE-A, 5G NR, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
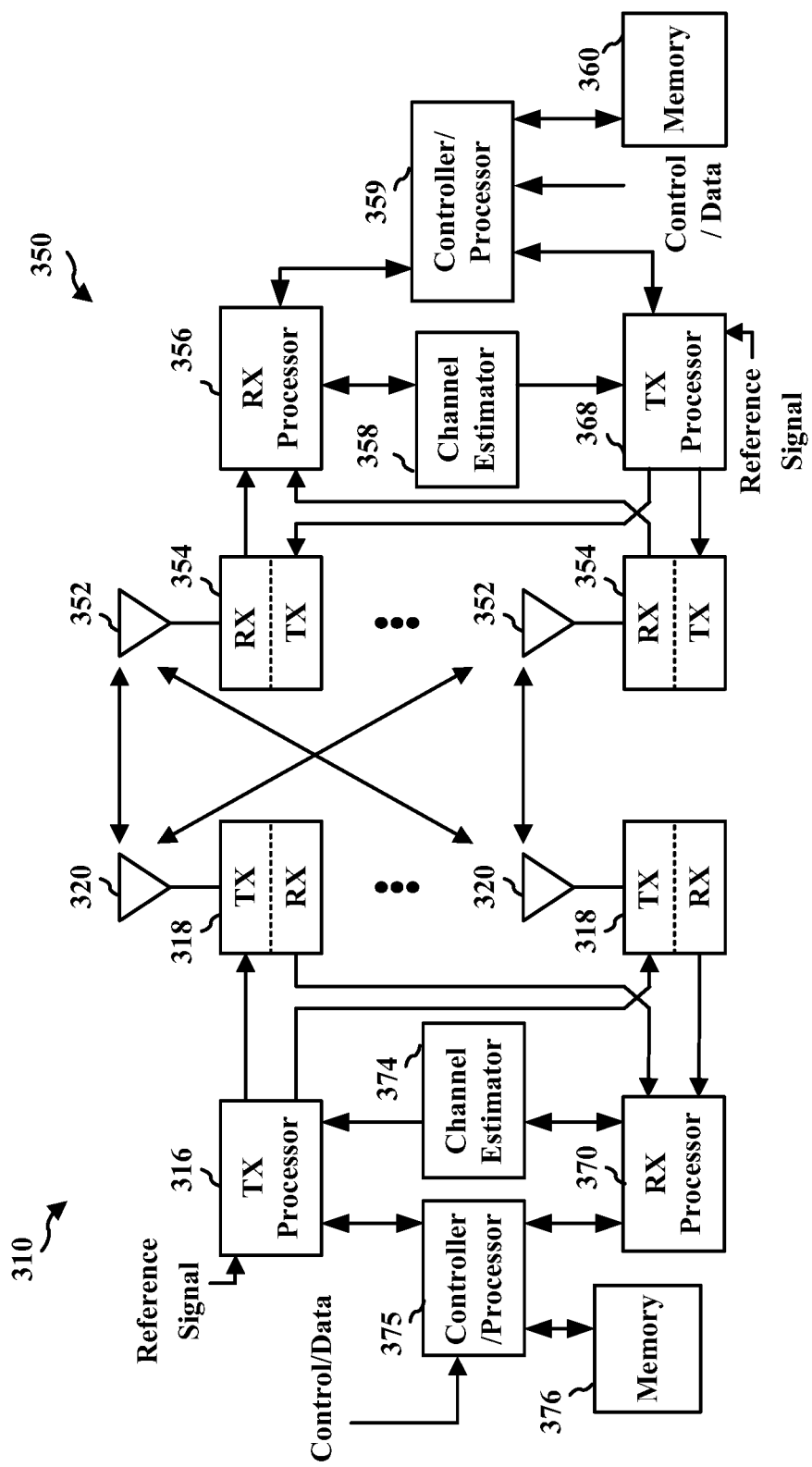
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some wireless communications, a user may have an active transmission on a base station. The active transmission may be a video or a voice call, such as, for example, an internet protocol (IP) multimedia subsystem (IMS) multimedia telephony service (MMTel) call. An IMS MMTel voice call may use enhanced audio codec on LTE and/or Wi-Fi networks than on circuit switching (CS) networks (e.g., a 2G, 3G, WCDMA, GSM, or other legacy non-LTE network). An IMS MMTel video call may be supported on LTE and Wi-Fi networks, but not on CS network. SRVCC handover thresholds may be configured by the network, and an SRVCC handover command from the network takes priority, such that the UE honors the SRVCC handover command. A handover from an LTE network to a Wi-Fi network may be controlled by a UE. As long as the call quality is acceptable on the LTE network, then the UE does not trigger a handover to a Wi-Fi network even if the Wi-Fi network is able to accept the call. As such, when a UE moves to an LTE cell edge during an IMS MMTel voice/video call, if both CS and Wi-Fi networks are available, and the call quality is acceptable on the LTE network, once the SRVCC handover thresholds are met, the UE sends a measurement report to the LTE network. This may cause the IMS MMTel call to be handed over to the CS network, in response to an SRVCC handover command from the network, which may result in a loss of call quality due to the CS network using a lower quality codec, as well as a loss of video call capacity. As such, improving the manner in which a UE operates to allow for the UE to preempt SRVCC and trigger a handover to a Wi-Fi network is desirable.

Figure 4:
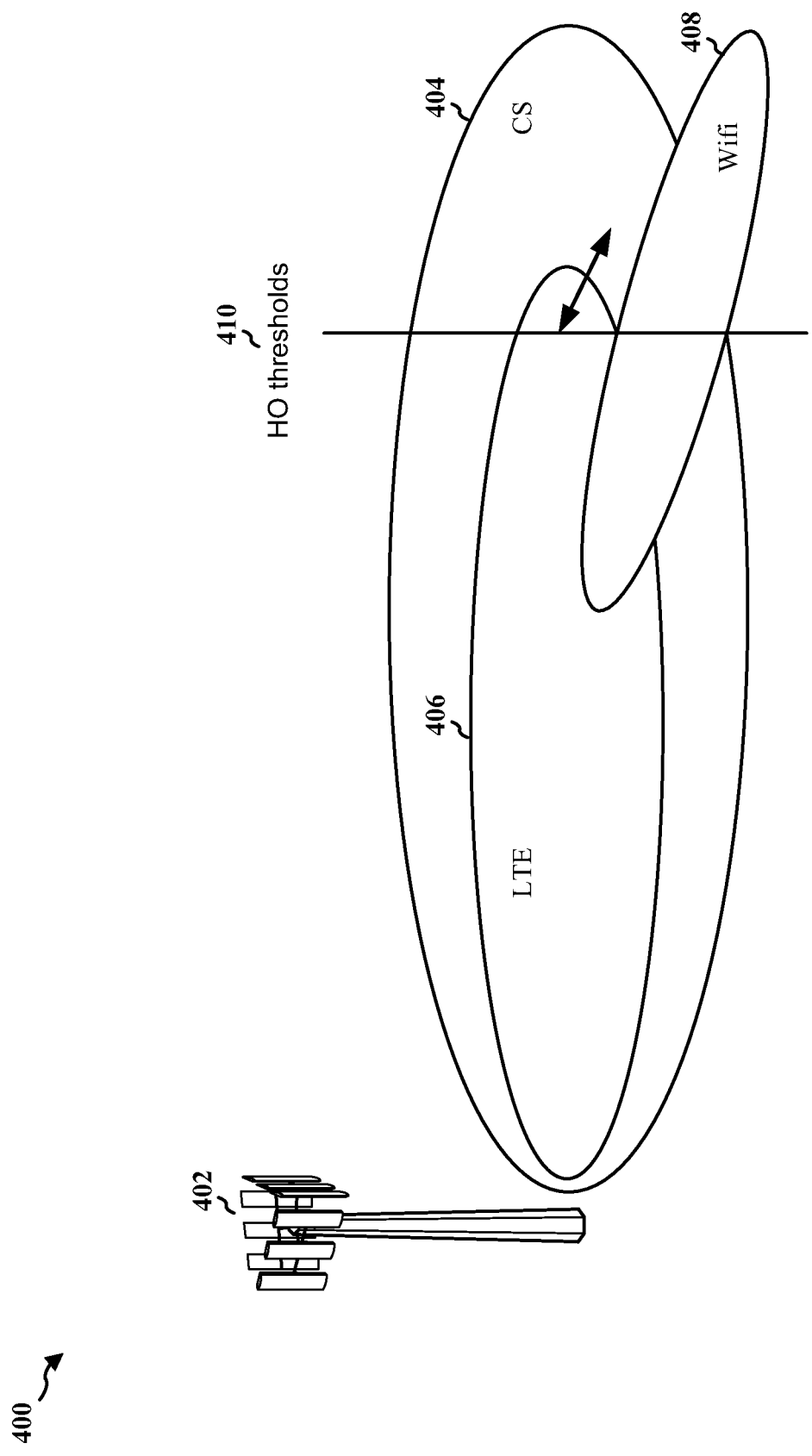
FIG. 4 is a diagram illustrating an example of a wireless communications system.

FIG. 4 is a diagram 400 illustrating an example of a wireless communications system. The diagram 400 includes a base station 402 which may provide coverage for a first network (e.g., LTE or NR) 406 and a second network (e.g., CS) 404. A Wi-Fi network 408 may also provide coverage that may overlap with the LTE network 406 and/or the CS network 404. As discussed above, a UE (not shown) may have an IMS MMTel call on the LTE network 406, and as the UE approaches the LTE cell edge, may result in handing the call over to the CS network when the HO thresholds 410 are met. The HO thresholds 410 may be configured by the first network. In instances where the UE approaches the LTE cell edge, the call will be handed over to the CS network without allowing the call to be handed over to the Wi-Fi network 408. As shown in FIG. 4, when the SRVCC thresholds are met, the call is handed over to the CS network, such that the UE misses out on the opportunity of handing the call over to the Wi-Fi network 408 which may maintain the call quality of the IMS MMTel call.

Figure 5:
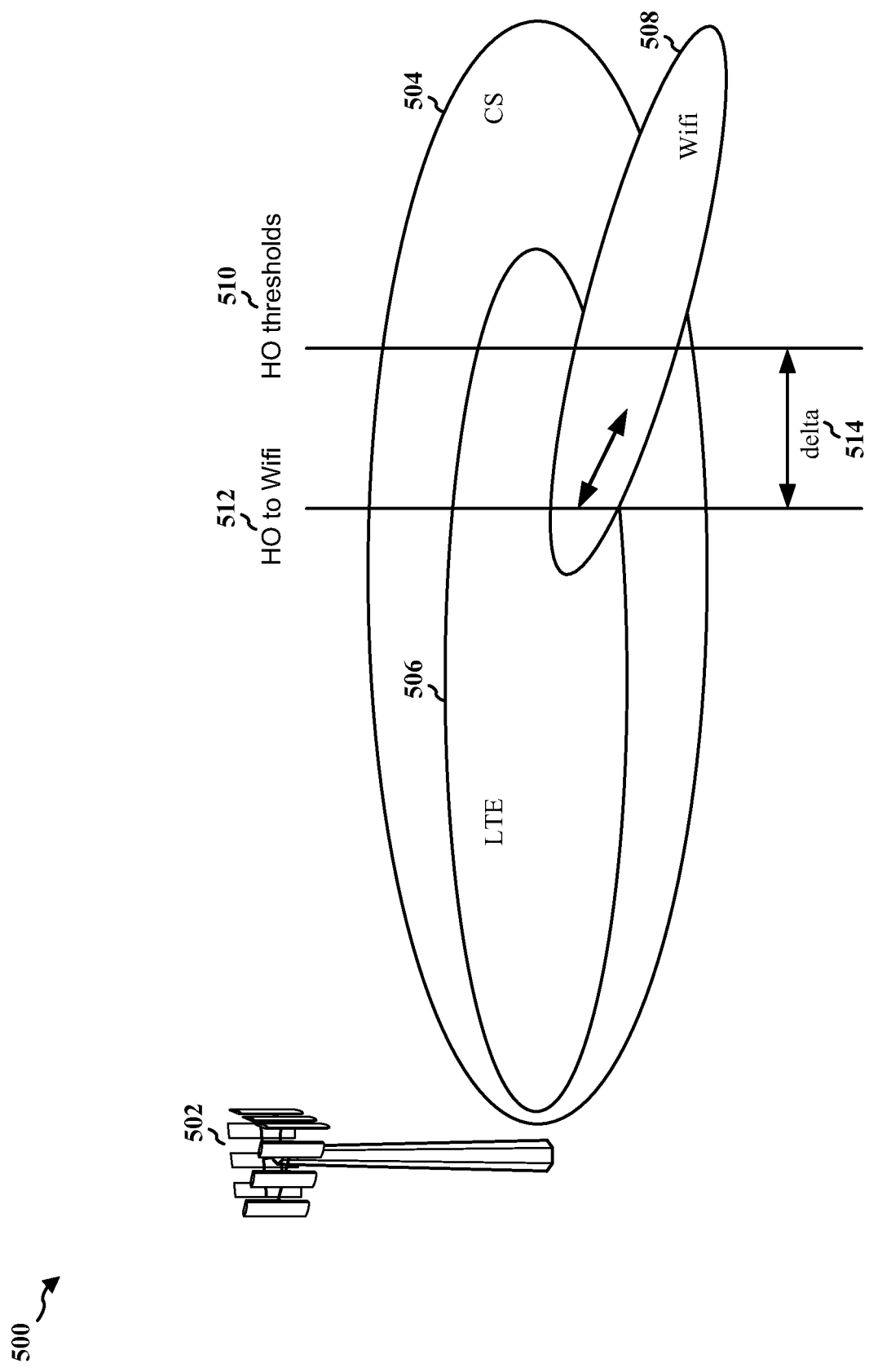
FIG. 5 is a diagram illustrating a handover to a Wi-Fi network.

FIG. 5 is a diagram 500 illustrating a handover to a Wi-Fi network. The diagram 500 includes a base station 502, similar to base station 402, which may provide coverage for an LTE network 506 and a CS network 504. A Wi-Fi network 508, similar to Wi-Fi network 408, may also provide coverage that may overlap with the LTE network 506 and/or the CS network 504.

In the aspect of FIG. 5, the UE (not shown) may measure the signal strength of the LTE network 506 and the CS network 504 before the SRVCC HO thresholds 510 are met, and the UE triggers a handover 512 to the Wi-Fi network 508 if the Wi-Fi network 508 is able to serve the UE (e.g., continue the call on Wi-Fi network 508). A handover 512 to the Wi-Fi network may allow the call to continue as an IMS MMTell call on the Wi-Fi network 508. A handover to the Wi-Fi network 508 may allow for the same codec to be used on the Wi-Fi network 508 that are used on the LTE network 506. This also eliminates the need to downgrade the video call to a voice call if handed over to the CS network 504.

When there is an active call on the LTE network 506, the UE may determine whether to handing over the call to the Wi-Fi network 508 is possible. Upon determining that handing over the call to the Wi-Fi network 508 is possible, the UE may extend a TTT timer length, such that the UE may delay sending a measurement report of the signal strengths of the LTE network 506 and CS networks 504 to the first network. In some aspects, the UE may measure the signal strength of the LTE network 506 and the CS network 504 to determine if the SRVCC HO thresholds are being approached, based on a delta 514, in order to determine whether the signal strength of the CS network meets or exceeds the SRVCC HO thresholds 510. For example, the UE may measure the signal strength of the LTE network 506 in view of the delta 514 and the signal strength of the CS network 504 also in view of the delta 514 to determine whether the LTE network 506 may prepare to initiate a handover to the CS network 504. The UE may be configured to initiate the handover 512 to the Wi-Fi network 508 prior to the HO thresholds 510 (e.g., SRVCC) being met by the CS network 504. The handover 512 to the Wi-Fi network 508 may occur prior to the HO thresholds 510 being met by the CS network 504, based on the delta 514, where the delta 514 is separation of signal strength between the handover 512 to the Wi-Fi network 508 and the HO thresholds 510 of the LTE network 506 for a handover to the CS network 504. The SRVCC HO thresholds 510 may be configured by the LTE network 506. In some aspects, the delta 514 may be an internal parameter of the UE to control the size of the SRVCC region, where the SRVCC region is when the UE approaches the LTE cell edge and approaches the HO thresholds 510 to handover to the CS network. The SRVCC region may be based on the signal strength separation between the HO thresholds 510 and the handover 512 to the Wi-Fi network, based on the delta 514.

Figure 6:
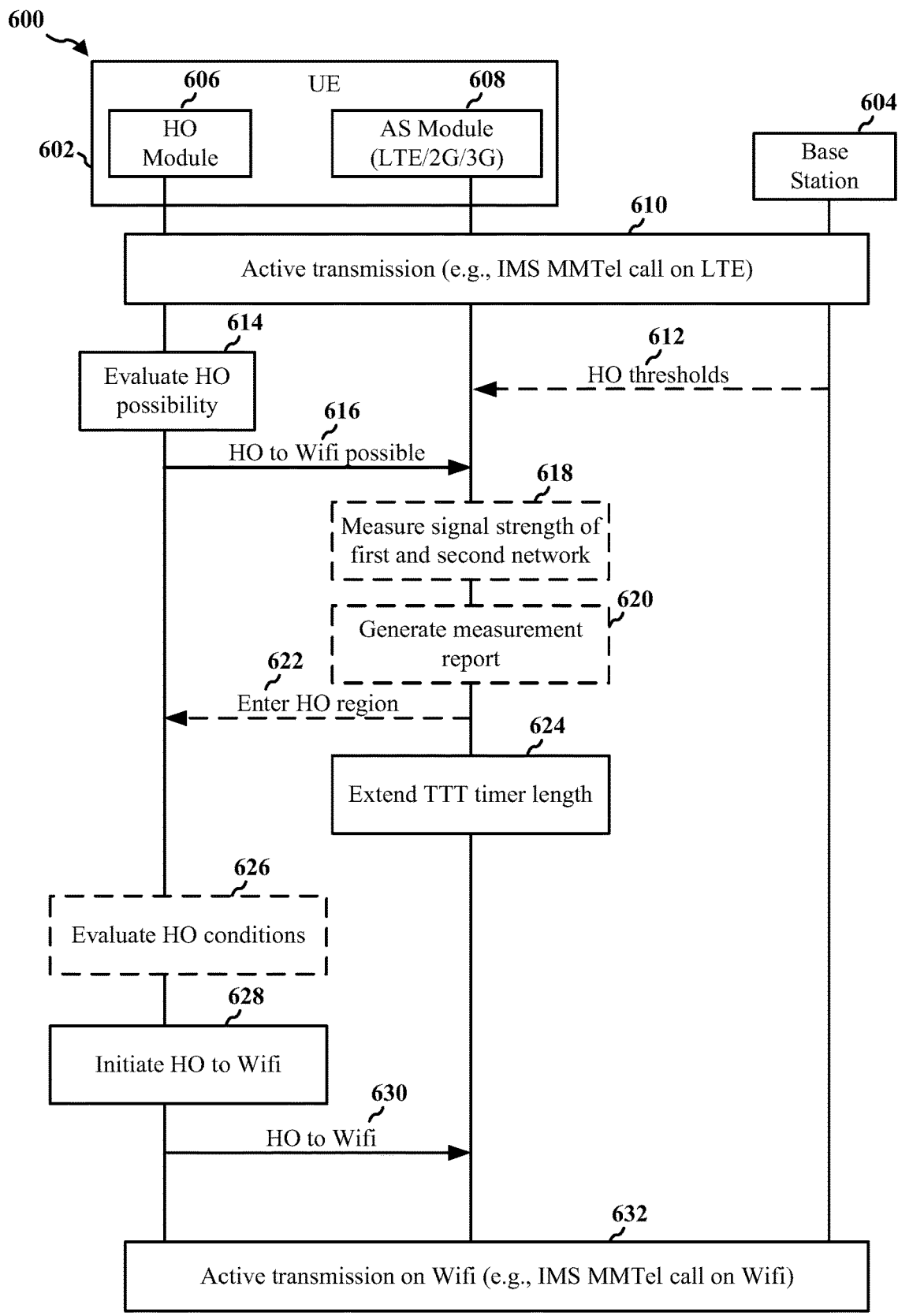
FIG. 6 is a call flow diagram of signaling between a UE and a base station in accordance with certain aspects of the disclosure.

FIG. 6 is a call flow diagram of signaling between a UE 602 and a base station 604 in accordance with certain aspects of the disclosure. Optional aspects are illustrated with a dashed line. The base station 604 may provide a cell serving the UE 602. For example, in the context of FIG. 1, the base station 604 may correspond to the base station 102/180 and, accordingly, the cell may include a geographic coverage area 110 in which communication coverage is provided and/or small cell 102' having a coverage area 110'. Further, the UE 602 may correspond to at least UE 104. In another example, in the context of FIG. 3, the base station 604 may correspond to the base station 310 and the UE 602 may correspond to the UE 350.

As illustrated in FIG. 6, the UE 602 may comprise a handover (HO) module 606 and an access stratum (AS) module 608. The UE 602 may have an active transmission 610 with the base station 604. In some aspects, the active transmission may comprise a video or voice call, such as but not limited to, an IMS MMTel. The active transmission may be on a first network (e.g., LTE or NR).

In some aspects, for example at 612, the base station 604 may transmit handover thresholds for a handover between a first network and a second network. The UE 602 may receive the handover thresholds for the handover between the first network and the second network from the base station 604. In some aspects, the first network may comprise an LTE network or an NR network. In some aspects, the second network may comprise a CS network (e.g., a 2G, 3G, WCDMA, GSM, or other legacy non-LTE network).

At 614, the UE 602 may evaluate the possibility of a handover to a Wi-Fi network. The UE 602 may determine whether a Wi-Fi cell is viable as a first target cell to serve the UE 602. The UE 602 may determine whether the Wi-Fi cell is viable as the first target cell serving the UE to continue the active transmission on the Wi-Fi cell. The Wi-Fi cell may be a target cell from a plurality of target cells. In some aspects, the Wi-Fi network may be viable as the target cell serving the UE to continue the active transmission on the Wi-Fi cell based on at least a signal strength of the Wi-Fi cell. In some aspects, the UE 602 may determine whether the Wi-Fi cell is viable as the target cell prior to a second cell, from the plurality of target cells, meets handover thresholds for a handover between the first network and the second target cell.

In some aspects, the handover (HO) module 606 of the UE 602 may send an indication 616 to the access stratum (AS) module 608 of the UE that a handover to the Wi-Fi network is possible. For example, the HO module 606 may send a mobility_to_wifi_possible indication 616 to the AS module 608, if there is an active call on the first network and handing over the call from the first network to the Wi-Fi cell is possible. The indication 616 may be sent to the AS module 608 based on the determination that the Wi-Fi cell is viable as the target cell.

At 618, the UE 602 may measure the signal strength of the active transmission on the first network and the second target cell on the second network. The UE 602 may measure the signal strength of the active transmission on the first network and the second target cell on the second network to determine whether the signal strengths of the first and second network are approaching handover thresholds. In some aspects, the AS module 608 may be configured to measure the signal strength of the first and second networks.

At 620, the UE 602 may generate a measurement report of the signal strengths of the active transmission on the first network and the second target cell. The UE 602 may generate the measurement report of the signal strengths of the first network and the second target cell in preparation of a handover between the first and second networks. The measurement report may be based on the signal strengths of the active transmission and the second target cell. In some aspects, the AS module 608 of the UE 602 may generate the measurement report.

In some aspects, the AS module 608 may provide an indication 622 to the HO module 606 of the UE 602 entering an SRVCC region. The SRVCC region may include the cell edge of the first network, such that the coverage or signal strength of the first network is decreasing and the first network may prepare to initiate a handover to the second network. The SRVCC region may be based on the SRVCC HO thresholds 510 and the delta 514. For example, the AS module 608 may send a SRVCC_region_enter indication 622 to the HO module 606 if the UE 602 enters the SRVCC region, indicating that a handover from the first network to the second network (e.g., CS based network) may occur. In some aspects, the AS module 608 may send the indication 622 if the RSRP of the first network is less than the HO thresholds 510 plus the delta 514, and the RSSI of the second network is greater than the HO thresholds 510 minus the delta 514. In some aspects, the AS module 608 may send the indication 622 if the RSSI of the second network is greater than the HO thresholds 510 minus the delta 514. The delta may be an internal parameter of the UE that may be configured to control the size of the SRVCC region, such that altering the value of the delta may alter the size of the SRVCC region. For example, if the TTT is large (e.g., 1.28 seconds), then the delta may be a small value, e.g., 2 dB. In some aspects, if the TTT is small (e.g., 128 ms or 256 ms), then the delta may comprise a value of approximately 5 dB. The values provided for the TTT and the delta are examples and the disclosure is not intended to be limited to the examples disclosed herein. In some aspects, the TTT may be less than or greater than 1.28 seconds. In some aspects, the delta may be less than or greater than 2 dB.

At 624, the UE 602 may extend a time-to-trigger (TTT) timer length. The UE 602 may extend the TTT timer length based at least in part on the determination that the Wi-Fi cell is viable as the target cell serving the UE to continue the active transmission on the Wi-Fi cell. In some aspects, extending the TTT timer length may delay a transmission of the measurement report 620 from the UE 602 to the base station 604. The delay in the transmission of the measurement report may allow for the initiation of the handover to the Wi-Fi cell from the first network. In some aspects, the measurement report may not be transmitted at the expiration of a TTT timer if the handover to the Wi-Fi cell has been completed. In some aspects, the measurement report may not be transmitted at the expiration of the TTT timer if the first network does not have the active transmission. In some aspects, the AS module 608, upon receipt of the indication 616 from the HO module 606, may extend the TTT timer length if SRVCC thresholds are met.

In some aspects, for example at 626, the HO module 606 may evaluate handover conditions. The HO module 606 may evaluate the signal strength of the Wi-Fi cell if the AS module 608 sends the indication 622 that the UE 602 has entered the handover region (e.g., the SRVCC region). In some aspects, the UE 602 may determine whether a signal strength of the second target cell is greater than a signal strength of the active transmission on the first network. The UE 602 may determine whether the signal strength of the second target cell is greater than a signal strength of the active transmission on the first network, such that the first network is in preparation to initiate the handover of the active transmission to the second target cell.

At 628, the UE 602 may initiate the handover to the Wi-Fi cell from the first network. The UE 602 may initiate the handover to the Wi-Fi cell from the first network prior to the expiration of a TTT timer. The UE may initiate the handover to the Wi-Fi cell from the first network prior to the first network initiating the handover to the second target cell, from the plurality of target cells, on the second network. In some aspects, the UE may initiate the handover to the Wi-Fi cell from the first network if a signal strength of the Wi-Fi cell is greater than a signal strength of the first network. In some aspects, the HO module 606 of the UE 602 may initiate the handover to the Wi-Fi network from the first network. For example, the HO module 606 may initiate the handover to the Wi-Fi network if the signal strength of the Wi-Fi cell is acceptable for the active transmission.

In some aspects, the HO module 606 may send an indication 630 to initiate the handover to the Wi-Fi network. For example, the HO module 606 may send a mobility_to_wifi_start indication 630 to the AS module 608 if handing over the active transmission from the first network to the Wi-Fi cell is triggered.

At 632, the active transmission is handed over to the Wi-Fi cell, such that the active transmission (e.g., IMS MMTel) from the first network is maintained on the Wi-Fi cell. When the TTT timer expires, the UE 602 does not send the measurement report to the base station 604 if the active transmission is no longer present between the UE and the first network. In some aspects, the measurement report is not sent to the base station 604 upon the expiration of the TTT timer because the active transmission has been handed over to the Wi-Fi cell. In some aspects, the measurement report is not sent to the base station upon the expiration of the TTT timer if the active transmission is not present between the UE 602 and the base station 604.

Figure 7:
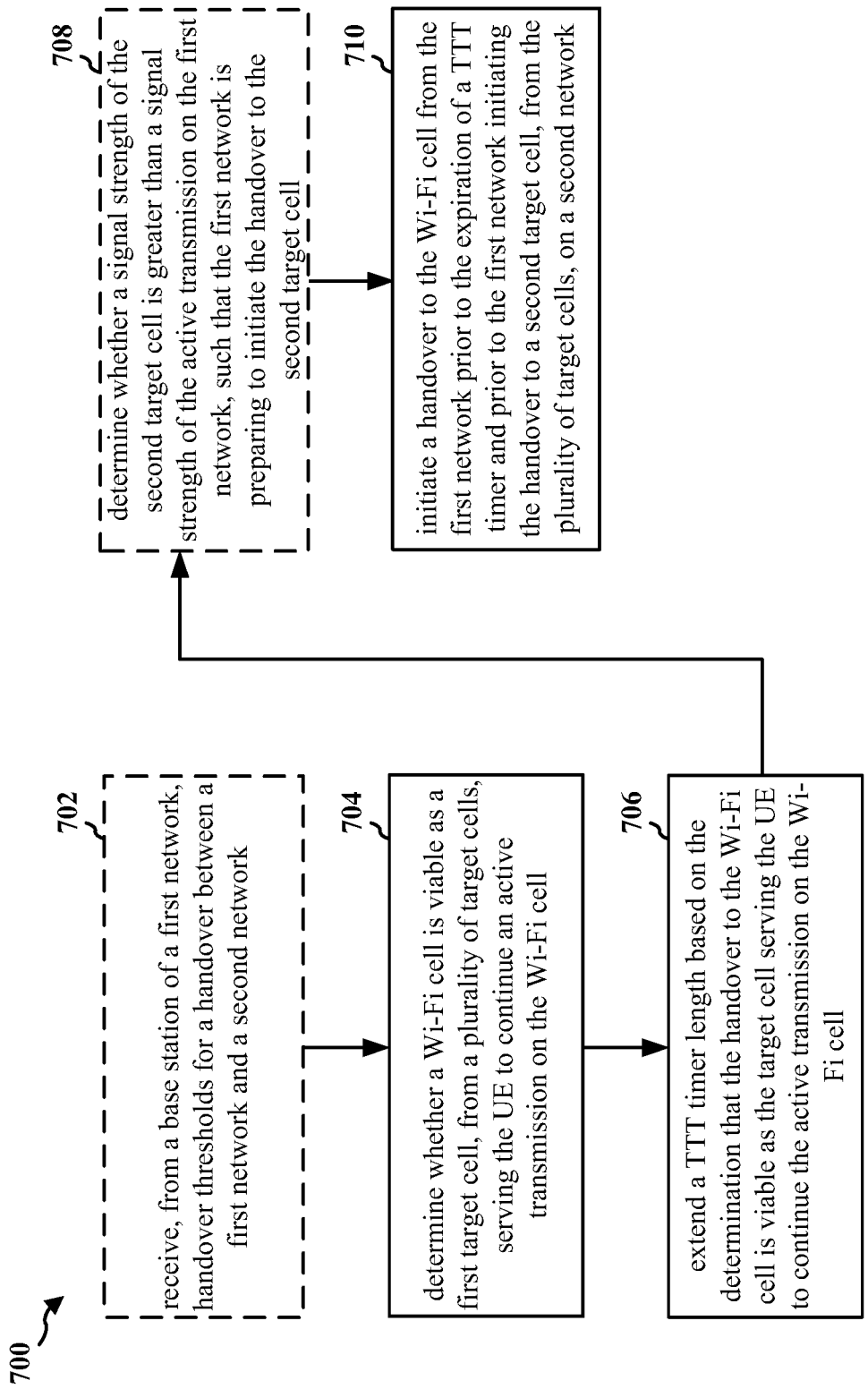
FIG. 7 is a flowchart of a method of wireless communication.

FIG. 7 is a flowchart 700 of a method of wireless communication. The method may be performed by a UE or a component of a UE (e.g., the UE 104, 350, 602; the apparatus 802/802'; the processing system 914, which may include the memory 360 and which may be the entire UE 350 or a component of the UE 350, such as the TX processor 368, the RX processor 356, and/or the controller/processor 359). According to various aspects, one or more of the illustrated operations of method 700 may be omitted, transposed, and/or contemporaneously performed. Optional aspects are illustrated with a dashed line. The method may enable a UE to preempt SRVCC by triggering a handover to a Wi-Fi network.

In some aspects, for example at 702, the UE may receive handover thresholds for a handover between a first network and a second network. For example, 702 may be performed by threshold component 806 of apparatus 802. The UE may receive the handover thresholds for the handover between the first network and the second network from a base station. In some aspects, the first network may comprise an LTE network or an NR network. In some aspects, the second network may comprise a CS network (e.g., a 2G, 3G, WCDMA, GSM, or other legacy non-LTE network).

At 704, the UE may determine whether a Wi-Fi cell is viable as a first target cell. For example, 704 may be performed by determination component 808 of apparatus 802. The UE may determine whether the Wi-Fi cell is viable as the first target cell serving the UE to continue the active transmission on the Wi-Fi cell. The Wi-Fi cell may be the first target cell from a plurality of target cells. In some aspects, the Wi-Fi network may be viable as the target cell serving the UE to continue the active transmission on the Wi-Fi cell based on at least a signal strength of the Wi-Fi cell. In some aspects, the UE may determine whether the Wi-Fi cell is viable as the target cell prior to a second target cell, from the plurality of target cells, meets handover thresholds for a handover between the first network and the second target cell.

In some aspects, the UE may measure a signal strength of the active transmission on the first network and the second target cell on the second network. The UE may measure the signal strength of the active transmission on the first network and the second target cell on the second network to determine whether the signal strengths of the first and second network are approaching handover thresholds.

In some aspects, the UE may generate a measurement report of the signal strengths of the active transmission and the second target cell. The UE may generate the measurement report of the signal strengths of the active transmission and the second target cell in preparation of a handover between the first and second networks. The measurement report may be based on the signal strengths of the active transmission and the second target cell.

At 706, the UE may extend a TTT timer length. For example, 706 may be performed by extension component 810 of apparatus 802. The UE may extend the TTT timer length based at least in part on the determination that the Wi-Fi cell is viable as the target cell serving the UE to continue the active transmission on the Wi-Fi cell. In some aspects, extending the TTT timer length may delay a transmission of the measurement report from the UE to a base station. The measurement report may comprise signal strengths of the first network and the second network in preparation of the handover from the first network to the second network. The delay in the transmission of the measurement report may allow for the initiation of the handover to the Wi-Fi cell from the first network. For example, the delay in the transmission of the measurement report may allow for the UE to trigger or initiate the handover to the Wi-Fi cell. In some aspects, the measurement report may not be transmitted at the expiration of a TTT timer if the handover to the Wi-Fi cell has been completed. In some aspects, the measurement report may not be transmitted at the expiration of the TTT timer if the first network does not have the active transmission. The first network may no longer have the active transmission due to the UE triggering the handover to the Wi-Fi cell. As such, no measurement report would be transmitted from the UE to the base station, because there will no longer be a need to prepare for a handover from the first network to the second network once the active transmission has been handed over to the Wi-Fi cell.

In some aspects, for example at 708, the UE may determine whether a signal strength of the second target cell is greater than a signal strength of the active transmission on the first network. For example, 708 may be performed by signal component 812 of apparatus 802. The UE may determine whether the signal strength of the second target cell is greater than a signal strength of the active transmission on the first network, such that the first network is in preparation to initiate the handover of the active transmission to the second target cell.

At 710, the UE may initiate the handover to the Wi-Fi cell from the first network. For example, 710 may be performed by handover component 814 of apparatus 802. The UE may initiate the handover to the Wi-Fi cell from the first network prior to the expiration of a TTT timer. The UE may initiate the handover to the Wi-Fi cell from the first network prior to the first network initiating the handover to the second target cell, from the plurality of target cells, on the second network. In some aspects, the UE may initiate the handover to the Wi-Fi cell from the first network if a signal strength of the Wi-Fi cell is greater than a signal strength of the first network.

Figure 8:
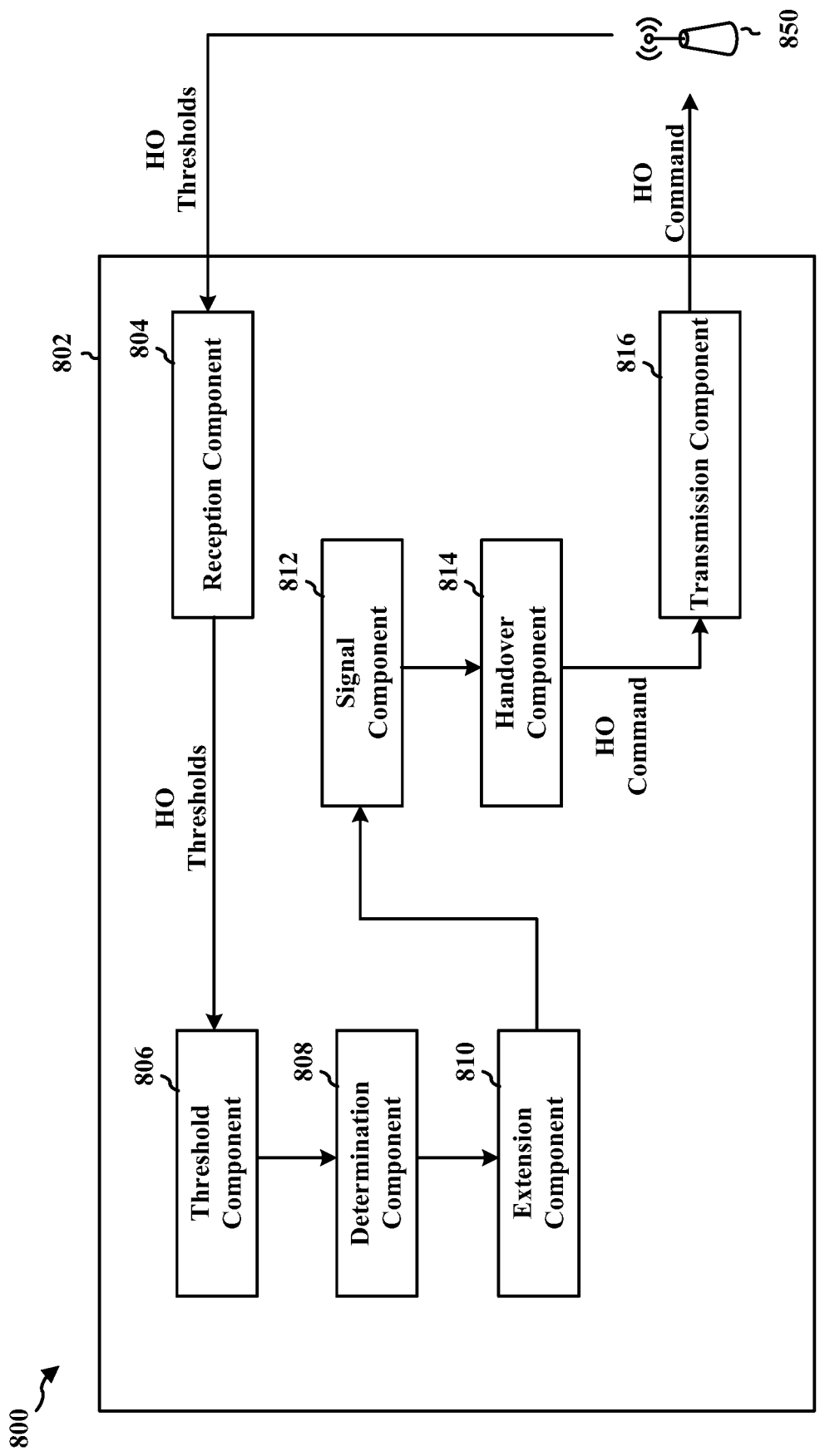
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE or a component of a UE. The apparatus includes a reception component 804 that may be configured to receive various types of signals/messages and/or other information from other devices, including, for example, the base station 750. The apparatus includes a threshold component 806 that may be configured to receive, from a base station of a first network, handover thresholds for a handover between first and second networks, e.g., as described in connection with 702 of FIG. 7. The apparatus includes a determination component 808 that may be configured to determine whether a Wi-Fi cell is viable as a first target cell, from a plurality of target cells, serving the UE to continue the active transmission on the Wi-Fi cell, e.g., as described in connection with 704 of FIG. 7. The apparatus includes an extension component 810 that may be configured to extend a TTT timer length based at least in part on the determination that the Wi-Fi cell is viable as the target cell serving the UE to continue the active transmission on the Wi-Fi cell, e.g., as described in connection with 706 of FIG. 7. The apparatus includes a signal component 812 that may be configured to determine whether a signal strength of the second target cell is greater than a signal strength of the active transmission on the first network, such that the first network is preparing to initiate the handover to the second target cell, e.g., as described in connection with 708 of FIG. 7. The apparatus includes a handover component 814 that may be configured to initiate a handover to the Wi-Fi cell from the first network prior to the expiration of a TTT timer and prior to the first network initiating a handover to a second target cell, from the plurality of target cells, on a second network, e.g., as described in connection with 710 of FIG. 7. The apparatus includes a transmission component 816 that may be configured to transmit various types of signals/messages and/or other information to other devices, including, for example, the base station 750.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
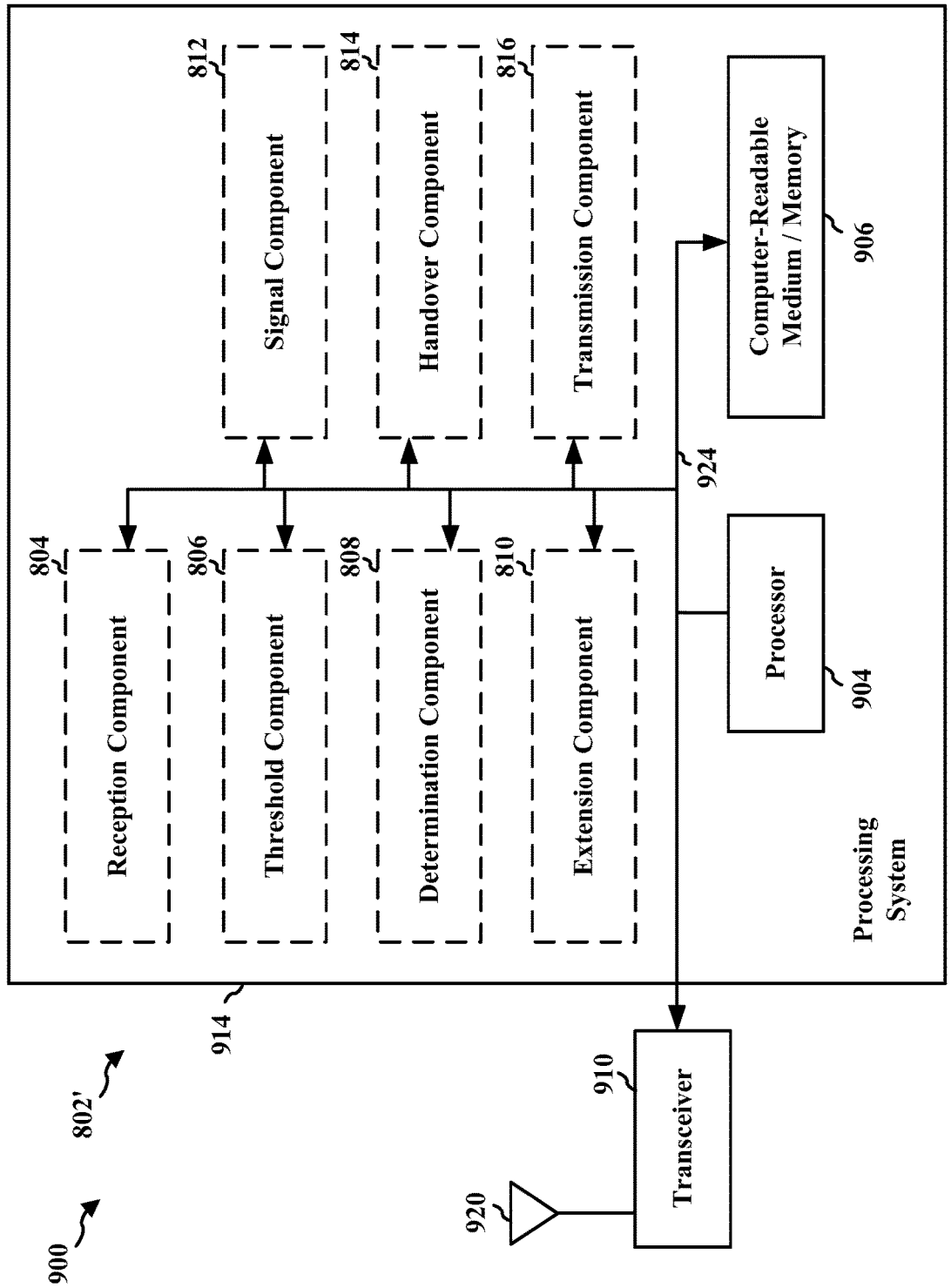
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 816, and based on the received information, generates a signal to be applied to the one or more antennas 920. The processing system 914 includes a processor 904 coupled to a computer-readable medium/ memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for determining whether a Wi-Fi cell is viable as a first target cell, from a plurality of target cells, serving the UE to continue the active transmission on the Wi-Fi cell. The apparatus includes means for extending a TTT timer length based at least one part on the determination that the Wi-Fi cell is viable as the target cell serving the UE to continue the active transmission on the Wi-Fi cell. The apparatus includes means for initiating a handover to the Wi-Fi cell from the first network prior to the expiration of the TTT timer and prior to the first network initiating a handover to a second target cell, from the plurality of target cells, on a second network. The apparatus further includes means for receiving, from a base station of the first network, handover thresholds for the handover between the first network and the second network. The apparatus further includes means for determining whether a signal strength of the second target cell is greater than a signal strength of the active transmission on the first network, such that the first network is preparing to initiate the handover to the second target cell. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
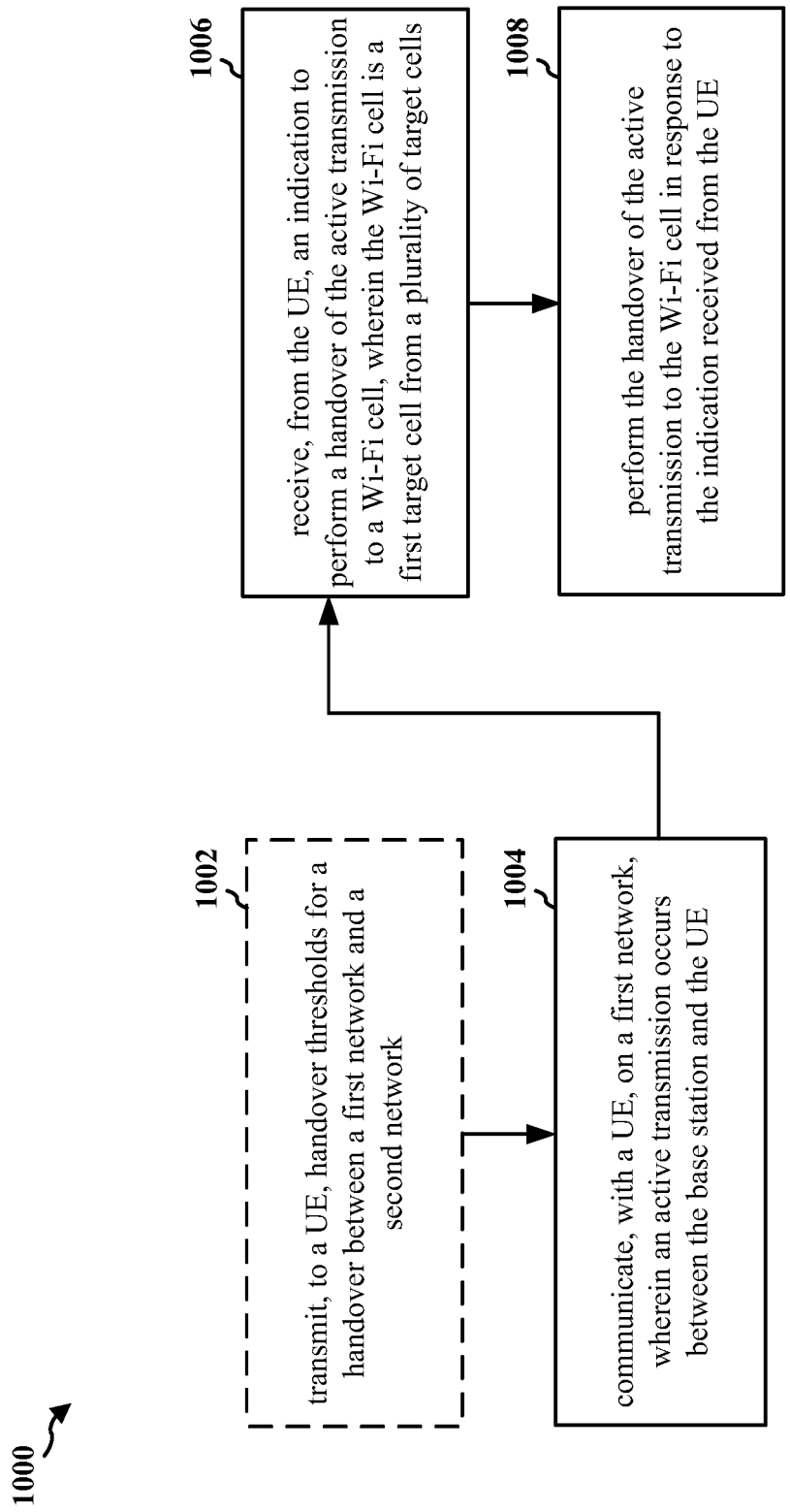
FIG. 10 is a flowchart of a method of wireless communication.

FIG. 10 is a flowchart 1000 of a method of wireless communication. The method may be performed by a base station or a component of a base station (e.g., the base station 102, 180, 402, 502, 604, 850; the apparatus 1102/1102'; the processing system 1214, which may include the memory 376 and which may be the entire base station 310 or a component of the base station 310, such as the TX processor 316, the RX processor 370, and/or the controller/processor 375). According to various aspects, one or more of the illustrated operations of method 1000 may be omitted, transposed, and/or contemporaneously performed. Optional aspects are illustrated with a dashed line. The method may enable a base station to handover an active transmission to a Wi-Fi network in response to an indication from the UE triggering the handover to the Wi-Fi network.

In some aspects, for example at 1002, the base station may transmit handover thresholds to a UE. For example, 1002 may be performed by threshold component 1106 of apparatus 1102. The handover thresholds transmitted to the UE may be handover thresholds for a handover between a first network and a second network. In some aspects, the first network may comprise an LTE network or an NR network. In some aspects, the second network may comprise a CS network (e.g., a 2G, 3G, WCDMA, GSM, or other legacy non-LTE network).

At 1004, the base station may communicate with a UE on the first network. For example, 1004 may be performed by communication component 1108 of apparatus 1102. The base station may communicate with the UE on the first network, such that an active transmission occurs between the base station and the UE.

At 1006, the base station may receive an indication to perform a handover of the active transmission to a Wi-Fi cell. For example, 1006 may be performed by indication component 1110 of apparatus 1102. The base station may receive the indication to perform the handover of the active transmission to the Wi-Fi cell from the UE. The Wi-Fi cell may be a first target cell from a plurality of target cells. In some aspects, the Wi-Fi cell is viable as the first target cell serving the UE to continue the active transmission on the Wi-Fi cell based on at least a signal strength of the Wi-Fi cell. In some aspects, the base station may receive the indication to perform the handover of the active transmission to the Wi-Fi cell prior to the expiration of the TTT timer. In some aspects, the base station may receive the indication to perform the handover of the active transmission to the Wi-Fi cell prior to the first network initiating a handover to a second target cell on a second network. The second target cell may be from the plurality of target cells. In some aspects, the base station may receive the indication to perform the handover of the active transmission to the Wi-Fi cell if a signal strength of the Wi-Fi cell is greater than a signal strength of the first network.

At 1008, the base station may perform the handover of the active transmission to the Wi-Fi cell. For example, 1008 may be performed by handover component 1112 of apparatus 1102. The base station may perform the handover of the active transmission to the Wi-Fi cell in response to the indication received from the UE.

Figure 11:
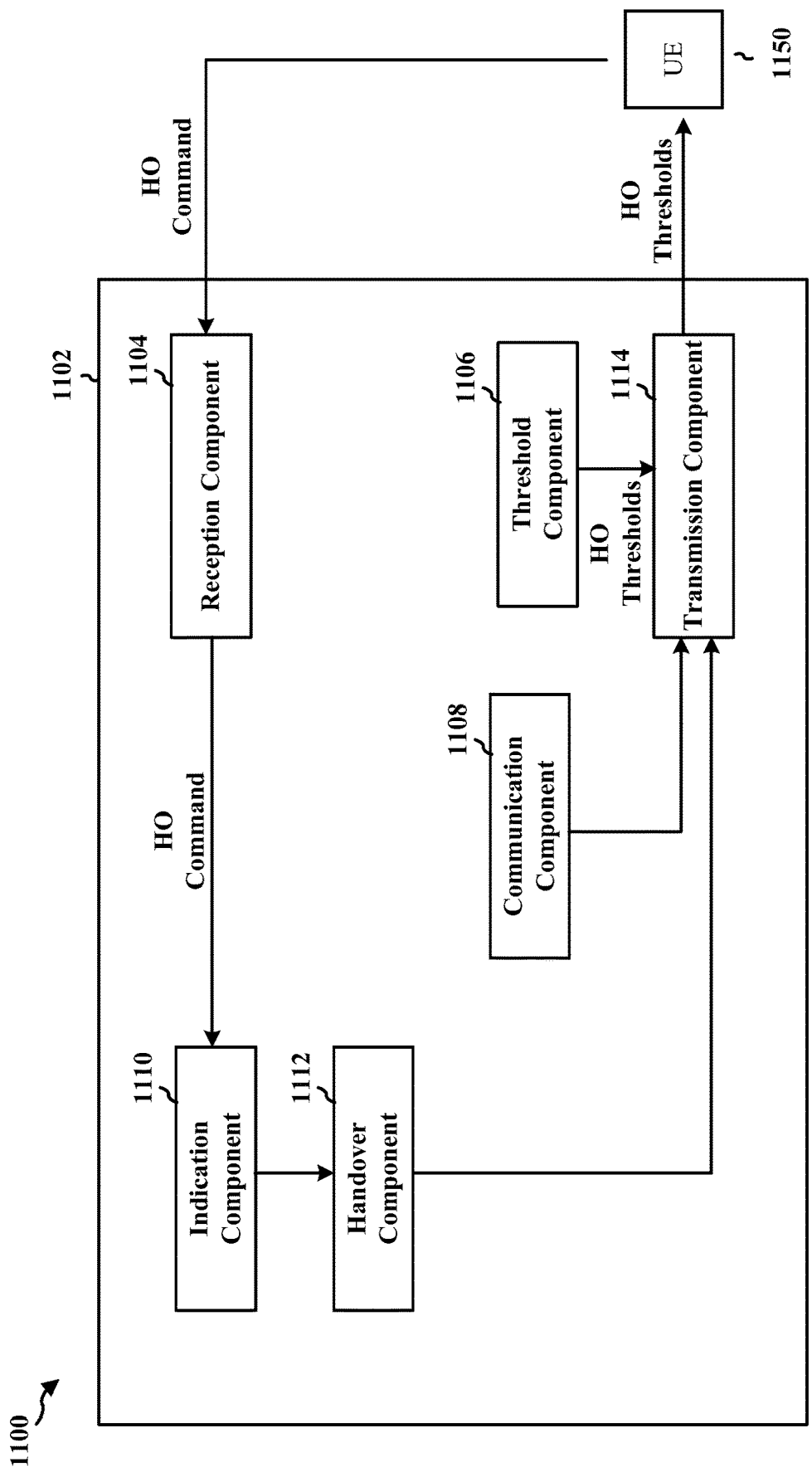
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station or a component of a base station. The apparatus includes a reception component 1104 that may be configured to receive various types of signals/messages and/or other information from other devices, including, for example, the UE 1150. The apparatus includes a threshold component 1106 that may be configured to transmit, to the UE, handover thresholds for a handover between the first network and the second network, e.g., as described in connection with 1002 of FIG. 10. The apparatus includes a communication component 1108 that may be configured to communicate, with the UE, on a first network, e.g., as described in connection with 1004 of FIG. 10. The apparatus includes an indication component 1110 that may be configured to receive, from the UE, an indication to perform a handover of the active transmission to a Wi-Fi cell, e.g., as described in connection with 1006 of FIG. 10. The apparatus includes a handover component 1112 that may be configured to perform the handover of the active transmission to the Wi-Fi cell in response to the indication received from the UE, e.g., as described in connection with 1008 of FIG. 10. The apparatus includes a transmission component 1114 that may be configured to transmit various types of signals/messages and/or other information to other devices, including, for example, the UE 1150.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
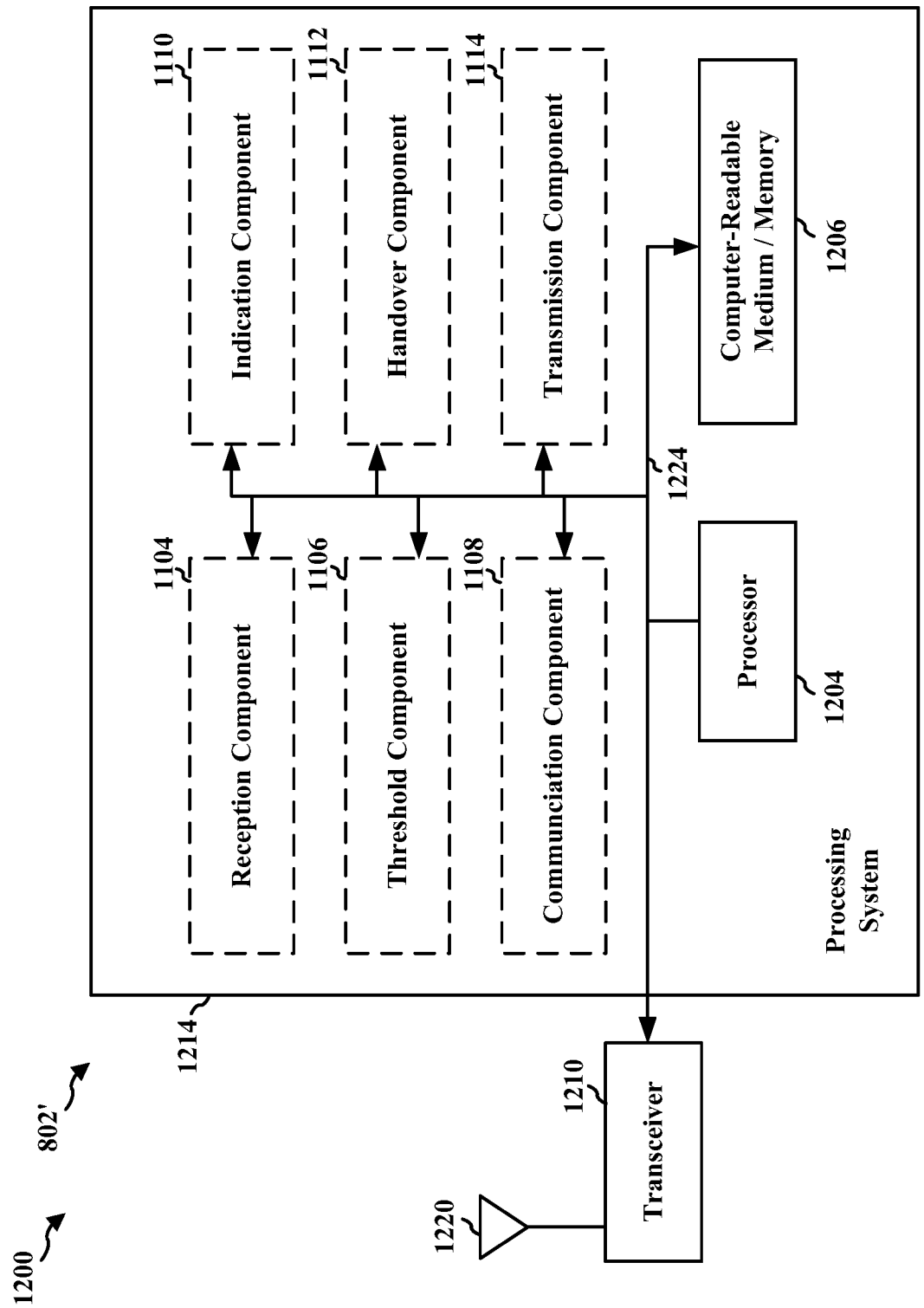
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, and the computer-readable medium memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1114, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for communicating, with a UE, on a first network. An active transmission occurs between the base station and the UE. The apparatus includes means for receiving, from the UE, an indication to perform a handover of the active transmission to a Wi-Fi cell. The Wi-Fi cell is a first target cell from a plurality of target cells. The apparatus includes means for performing the handover of the active transmission to the Wi-Fi cell in response to the indication received from the UE. The apparatus further includes means for transmitting, to the UE, handover thresholds for a handover between the first network and a second network. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure allows a UE to initiate a handover from a first network (e.g., LTE) to a Wi-Fi network prior to SRVCC thresholds being met. The UE may have an active transmission (e.g., video or voice call) on the first network, and may be configured to trigger a handover to the Wi-Fi network as the UE moves to the cell edge of the LTE. At least one advantage of the disclosure is that the active transmission may continue on the Wi-Fi network without a reduction or loss of quality of the active transmission (e.g., video or voice call). The quality of the active transmission on the Wi-Fi network may not experience a reduction or loss of quality because the same codecs may be used on the Wi-Fi network as is used on the first network (e.g., LTE).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining whether a Wi-Fi cell is viable as a first target cell, from a plurality of target cells, serving the UE to continue an active transmission on the Wi-Fi cell;
   extending a time-to-trigger (TTT) timer length based at least in part on the determination that the Wi-Fi cell is viable as the target cell serving the UE to continue the active transmission on the Wi-Fi cell; and
   initiating a handover to the Wi-Fi cell from the first network prior to the expiration of a TTT timer and prior to the first network initiating a handover to a second target cell, from the plurality of target cells, on a second network.

2. The method of claim 1, further comprising:
   receiving, from a base station of the first network, handover thresholds for the handover between the first network and the second network.

3. The method of claim 1, wherein the Wi-Fi cell is viable as the target cell serving the UE to continue the active transmission on the Wi-Fi cell based on at least a signal strength of the Wi-Fi cell.

4. The method of claim 1, wherein the determining whether the Wi-Fi cell is viable as the target cell occurs prior to the second target cell on the second network meeting handover thresholds.

5. The method of claim 4, wherein the initiating the handover to the Wi-Fi cell from the first network occurs if a signal strength of the Wi-Fi cell is greater than a signal strength of the first network.

6. The method of claim 1, wherein the extending the TTT timer length delays a transmission of a measurement report from the UE to a base station, wherein the measurement report comprises signal strengths of the first network and the second network in preparation of the handover from the first network to the second network.

7. The method of claim 6, wherein the delay in the transmission of the measurement report allows for the initiation of the handover to the Wi-Fi cell from the first network.

8. The method of claim 7, wherein the measurement report is not transmitted at the expiration of the TTT timer if the handover to the Wi-Fi cell is completed.

9. The method of claim 7, wherein the measurement report is not transmitted at the expiration of the TTT time if the first network does not have the active transmission.

10. The method of claim 1, further comprising:
    determining whether a signal strength of the second target cell is greater than a signal strength of the active transmission on the first network, such that the first network is preparing to initiate the handover to the second target cell.

11. An apparatus for wireless communication at a user equipment (UE), comprising:
    a memory; and
    at least one processor coupled to the memory and configured to:
      determine whether a Wi-Fi cell is viable as a first target cell, from a plurality of target cells, serving the UE to continue an active transmission on the Wi-Fi cell;
      extend a time-to-trigger (TTT) timer length based at least in part on the determination that the Wi-Fi cell is viable as the target cell serving the UE to continue the active transmission on the Wi-Fi cell; and
      initiate a handover to the Wi-Fi cell from the first network prior to the expiration of a TTT timer and prior to the first network initiating a handover to a second target cell, from the plurality of target cells, on a second network.

12. The apparatus of claim 11, wherein the at least one processor is further configured to:
    receive, from a base station of the first network, handover thresholds for the handover between the first network and the second network.

13. The apparatus of claim 11, wherein the Wi-Fi cell is viable as the target cell serving the UE to continue the active transmission on the Wi-Fi cell based on at least a signal strength of the Wi-Fi cell.

14. The apparatus of claim 11, wherein the at least one processor is configured to determine whether the Wi-Fi cell is viable as the target cell prior to the second target cell on the second network meeting handover thresholds.

15. The apparatus of claim 14, wherein the at least one processor is configured initiate the handover to the Wi-Fi cell from the first network if a signal strength of the Wi-Fi cell is greater than a signal strength of the first network.

16. The apparatus of claim 11, wherein the at least one processor is configured to extend the TTT timer length to delay a transmission of a measurement report from the UE to a base station, wherein the measurement report comprises signal strengths of the first network and the second network in preparation of the handover from the first network to the second network.

17. The apparatus of claim 16, wherein the delay in the transmission of the measurement report allows for the initiation of the handover to the Wi-Fi cell from the first network.

18. The apparatus of claim 17, wherein the measurement report is not transmitted at the expiration of the TTT timer if the handover to the Wi-Fi cell is completed.

19. The apparatus of claim 17, wherein the measurement report is not transmitted at the expiration of the TTT time if the first network does not have the active transmission.

20. The apparatus of claim 11, wherein the at least one processor is further configured to:
    determine whether a signal strength of the second target cell is greater than a signal strength of the active transmission on the first network, such that the first network is preparing to initiate the handover to the second target cell.

21. A method of wireless communication at a base station, comprising:

communicating, with a user equipment (UE), on a first network, wherein an active transmission occurs between the base station and the UE;

receiving, from the UE, an indication to perform a handover of the active transmission to a Wi-Fi cell, wherein the Wi-Fi cell is a first target cell from a plurality of target cells, wherein the base station receives the indication to perform the handover of the active transmission to the Wi-Fi cell prior to an expiration of a time-to-trigger (TTT) timer and prior to the first network initiating a handover to a second target cell, from the plurality of target cells, on a second network; and performing the handover of the active transmission to the Wi-Fi cell in response to the indication received from the UE.

22. The method of claim 21, further comprising:
transmitting, to the UE, handover thresholds for a handover between the first network and a second network.

23. The method of claim 21, wherein the Wi-Fi cell is viable as the first target cell serving the UE to continue the active transmission on the Wi-Fi cell based on at least a signal strength of the Wi-Fi cell.

24. The method of claim 21, wherein the base station receives the indication to perform the handover of the active transmission to the Wi-Fi cell if a signal strength of the Wi-Fi cell is greater than a signal strength of the first network.

25. An apparatus for wireless communication at a base station, comprising:
a memory; and
at least one processor coupled to the memory and configured to:

communicate, with a user equipment (UE), on a first network, wherein an active transmission occurs between the base station and the UE;

receive, from the UE, an indication to perform a handover of the active transmission to a Wi-Fi cell, wherein the Wi-Fi cell is a first target cell from a plurality of target cells, wherein the at least one processor is configured to receive the indication to perform the handover of the active transmission to the Wi-Fi cell prior to an expiration of a time-to-trigger (TTT) timer length and prior to the first network initiating a handover to a second target cell, from the plurality of target cells, on a second network; and perform the handover of the active transmission to the Wi-Fi cell in response to the indication received from the UE.

26. The apparatus of claim 25, wherein the at least one processor is further configured to:
transmit, to the UE, handover thresholds for a handover between the first network and a second network.

27. The apparatus of claim 25, wherein the Wi-Fi cell is viable as the first target cell serving the UE to continue the active transmission on the Wi-Fi cell based on at least a signal strength of the Wi-Fi cell.

28. The apparatus of claim 25, wherein the at least one processor is configured to receive the indication to perform the handover of the active transmission to the Wi-Fi cell if a signal strength of the Wi-Fi cell is greater than a signal strength of the first network.

* * * * *